United States Patent
Gao (10) Patent No.: US 10,691,431 B2
(45) Date of Patent: Jun. 23, 2020

(54) METHOD FOR GENERATING INTEROPERABILITY RULES AND ELECTRONIC DEVICE

(71) Applicant: LENOVO (BEIJING) LIMITED, Beijing (CN)

(72) Inventor: Changlei Gao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 210 days.

(21) Appl. No.: 14/751,478

(22) Filed: Jun. 26, 2015

(65) Prior Publication Data

US 2016/0291947 A1  Oct. 6, 2016

(30) Foreign Application Priority Data

Mar. 31, 2015 (CN) .......................... 2015 1 0149264

(51) Int. Cl.
   *G06F 8/41* (2018.01)
   *G06F 9/445* (2018.01)
   *G06F 8/61* (2018.01)
   *H04L 12/64* (2006.01)

(52) U.S. Cl.
   CPC ................ *G06F 8/443* (2013.01); *G06F 8/61* (2013.01); *G06F 9/44505* (2013.01); *H04L 12/6418* (2013.01)

(58) Field of Classification Search
   CPC .. G06F 7/78; G06F 8/00-78; G06F 9/44-455; G06F 11/36
   See application file for complete search history.

(56) References Cited

U.S. PATENT DOCUMENTS

| | | | |
|---|---|---|---|
| 2003/0005037 A1* | 1/2003 | Aija ..................... | G06F 11/1417 709/203 |
| 2004/0197073 A1* | 10/2004 | Oesterreicher ........... | G06F 8/67 386/332 |
| 2005/0289264 A1* | 12/2005 | Illowsky ............... | G06F 1/3203 710/104 |
| 2013/0301407 A1* | 11/2013 | Zhou ..................... | H04L 45/245 370/230 |
| 2014/0244001 A1* | 8/2014 | Glickfield ............... | H04L 67/16 700/33 |
| 2014/0359602 A1* | 12/2014 | Sawaya ..................... | G06F 8/62 717/176 |
| 2015/0019714 A1* | 1/2015 | Shaashua ................ | H04L 67/24 709/224 |
| 2015/0052443 A1* | 2/2015 | Funase .................. | G06F 3/0484 715/736 |
| 2015/0082296 A1* | 3/2015 | Thomas ..................... | G06F 8/65 717/171 |
| 2016/0094421 A1* | 3/2016 | Bali ........................ | H04L 43/04 709/223 |

FOREIGN PATENT DOCUMENTS

CN         104216379 A     12/2014

* cited by examiner

*Primary Examiner* — Doon Y Chow
*Assistant Examiner* — Timothy P Duncan
(74) *Attorney, Agent, or Firm* — Scully Scott Murphy & Presser (57) ABSTRACT

A method of controlling Internet of Things (IoT) devices is provided. The method is based on detecting a device and obtaining control information and associated rules for controlling the device. The control functions available to a smart controller an vary based on the condition of the various rules and/or the interaction of the various devices detected.

18 Claims, 6 Drawing Sheets

METHOD FOR GENERATING INTEROPERABILITY RULES AND ELECTRONIC DEVICE

CROSS-REFERENCE TO RELATED APPLICATION(S)

This application claims priority to the Chinese Patent Application No. 201510149264.8, filed on Mar. 31, 2015, entitled "METHOD FOR GENERATING INTEROPERABILITY RULES AND ELECTRONIC DEVICE" which is incorporated herein by reference in its entirety.

TECHNICAL FIELD

The present disclosure relates to the field of electronic technology, and in particular, to an information processing method and an electronic device.

BACKGROUND

With continuous development of science and technology, increasing smart home devices are emerging and two devices may be connected by a user via a smart controller to achieve interoperability. For example, a door and an air conditioner are connected via a smart controller, and a rule is set as follows: if the door is open, the air conditioner is turned on; if the door is closed, the air conditioner is turned off. In this way, a user can achieve control of the air conditioner by only controlling the door to be in an open/closed state.

In the related art, when a user needs to set some interoperability rules, only one rule can be set at a time. For example, one rule is that if the door is open, the air conditioner is turned on, and another rule is that if the door is closed, the air conditioner is turned off. The user can only input one of the two rules at a time, and a response from one device can only be controlled through a state of another device. However, the interoperability rule cannot be set as controlling responses of multiple devices based on states of multiple devices. In addition, after the interoperability rules are set, the user needs to input the interoperability rules into the smart controller one by one, which is inconvenient to operate.

As the interoperability rules can only be set one by one in the related art when a user uses the smart controller, which imposes high requirements on users, and thus restricts the development of smart home devices and reduces usage efficiency of the smart home devices. Thus, there is a technical problem in the related art that the efficiency of setting interoperability rules by using a smart controller is low.

SUMMARY

Embodiments of the present disclosure provide a method for generating interoperability rules and an electronic device, to solve the technical problem in the related art that the efficiency of setting interoperability rules is low, thereby achieving the technical effect of improving the efficiency of setting the interoperability rules.

In an aspect, the present disclosure provides an information processing method, comprising: presetting multiple interoperability rules; selecting at least one interoperability rule from the multiple interoperability rules; loading the at least one interoperability rule; and controlling multiple smart home devices connected to a smart controller based on the at least one interoperability rule.

Alternatively, the presetting of multiple interoperability rules comprises pre-storing multiple application-scenario-based installation packages, wherein each installation package is a set of interoperability rules comprising one or more interoperability rules.

Alternatively, the selecting of at least one interoperability rule from the multiple interoperability rules comprises: scanning and obtaining the multiple smart home devices connected to the smart controller; determining, according to the multiple smart home devices, at least one selectable installation package which can be matched with the multiple smart home devices from the multiple application-scenario-based installation packages; displaying the at least one selectable installation package on a display screen of the smart controller for selection by a user; and obtaining a selection operation, and determining, in response to the selection operation, an installation package to be loaded from the at least one selectable installation package.

Alternatively, the loading of the at least one interoperability rule comprises: installing the installation package to be loaded; and automatically setting all interoperability rules in a set of interoperability rules corresponding to the installation package to be loaded when the installation package to be loaded is installed.

Alternatively, the selecting of at least one interoperability rule from the multiple interoperability rules comprises: displaying the multiple application-scenario-based installation packages on a display screen of the smart controller for selection by a user, wherein the multiple application-scenario-based installation packages are used as selectable installation packages; and obtaining a selection operation, and determining, in response to the selection operation, an installation package to be loaded from the multiple application-scenario-based installation packages.

Alternatively, the loading of the at least one interoperability rule comprises: installing the installation package to be loaded; scanning and obtaining the multiple smart home devices connected to the smart controller during the process of installing the installation package to be loaded; judging, based on the multiple smart home devices, whether all interoperability rules in the set of interoperability rules corresponding to the installation package to be loaded are matched with the multiple smart home devices, to generate a judgment result; and automatically setting all interoperability rules in the set of interoperability rules corresponding to the installation package to be loaded after the installation package to be loaded is installed when the judgment result indicates that the multiple smart home devices are matched with all interoperability rules in the set of interoperability rules corresponding to the installation package to be loaded.

Alternatively, after the judging, based on the multiple smart home devices, of whether all interoperability rules in the set of interoperability rules corresponding to the installation package to be loaded are matched with the multiple smart home devices, to generate a judgment result, the method further comprises: determining multiple first interoperability rules in the set of interoperability rules which are not matched with the multiple smart home devices when the judgment result indicates that not all of the interoperability rules in the set of interoperability rules corresponding to the installation package to be loaded are matched with the multiple smart home devices; processing the multiple first interoperability rules to generate a new set of interoperability rules corresponding to the installation package to be loaded; and automatically setting all interoperability rules in the new set of interoperability rules corresponding to the installation package to be loaded after the installation package to be loaded is installed.

Alternatively, after the judging, based on the multiple smart home devices, of whether all interoperability rules in the set of interoperability rules corresponding to the installation package to be loaded are matched with the multiple smart home devices, to generate a judgment result, the method further comprises: determining multiple first interoperability rules in the set of interoperability rules which are not matched with the multiple smart home devices when the judgment result indicates that not all of the interoperability rules in the set of interoperability rules corresponding to the installation package to be loaded are matched with the multiple smart home devices; and generating prompt information based on the multiple first interoperability rules.

Alternatively, the generating of prompt information based on the multiple first interoperability rules comprises: determining an absent first smart home device based on the multiple first interoperability rules, wherein the first smart home device does not belong to the multiple smart home devices; and generating prompt information of purchase information of the first smart home device; or generating, based on the multiple first interoperability rules, prompt information that accuracy in an application scenario corresponding to the installation package to be loaded will be reduced.

Alternatively, the controlling of multiple smart home devices connected to the smart controller based on the at least one interoperability rule comprises: obtaining state information of multiple condition devices; determining the at least one interoperability rule by inquiring a list of interoperability rules in an active state based on the state information of the multiple condition devices; and controlling multiple response devices based on the at least one interoperability rule.

In another aspect, the present disclosure provides an electronic device, comprising: a storage configured to preset multiple interoperability rules; a processor configured to select at least one interoperability rule from the multiple interoperability rules, to load the at least one interoperability rule, and to control multiple smart home devices connected to the smart controller based on the at least one interoperability rule.

Alternatively, the storage is configured to preset multiple interoperability rules by pre-storing multiple application-scenario-based installation packages, wherein each installation package is a set of interoperability rules comprising one or more interoperability rules.

Alternatively, the processor is further configured to scan and obtain the multiple smart home devices connected to the smart controller, to determine, according to the multiple smart home devices, at least one selectable installation package which can be matched with the multiple smart home devices from the multiple application-scenario-based installation packages, to display the at least one selectable installation package on a display screen of the smart controller for selection by a user, to obtain a selection operation, and to determine, in response to the selection operation, an installation package to be loaded from the at least one selectable installation package.

Alternatively, the processor is further configured to install the installation package to be loaded, and to automatically set all interoperability rules in a set of interoperability rules corresponding to the installation package to be loaded when the installation package to be loaded is installed.

Alternatively, the processor is further configured to display the multiple application-scenario-based installation packages on a display screen of the smart controller for selection by a user, wherein the multiple application-scenario-based installation packages are used as selectable installation packages, to obtain a selection operation, and to determine, in response to the selection operation, an installation package to be loaded from the multiple application-scenario-based installation packages.

Alternatively, the processor is further configured to install the installation package to be loaded, to scan and obtain the multiple smart home devices connected to the smart controller during the process of installing the installation package to be loaded, to judge, based on the multiple smart home devices, whether all interoperability rules in the set of interoperability rules corresponding to the installation package to be loaded are matched with the multiple smart home devices, to generate a judgment result, and to automatically set all interoperability rules in the set of interoperability rules corresponding to the installation package to be loaded after the installation package to be loaded is installed when the judgment result indicates that the multiple smart home devices are matched with all interoperability rules in the set of interoperability rules corresponding to the installation package to be loaded.

Alternatively, the processor is further configured to determine multiple first interoperability rules in the set of interoperability rules which are not matched with the multiple smart home devices when the judgment result indicates that not all of the interoperability rules in the set of interoperability rules corresponding to the installation package to be loaded are matched with the multiple smart home devices, to process the multiple first interoperability rules to generate a new set of interoperability rules corresponding to the installation package to be loaded, and to automatically set all interoperability rules in the new set of interoperability rules corresponding to the installation package to be loaded after the installation package to be loaded is installed.

Alternatively, the processor is further configured to determine multiple first interoperability rules in the set of interoperability rules which are not matched with the multiple smart home devices when the judgment result indicates that not all of the interoperability rules in the set of interoperability rules corresponding to the installation package to be loaded are matched with the multiple smart home devices, and to generate prompt information based on the multiple first interoperability rules.

Alternatively, the processor is further configured to determine an absent first smart home device based on the multiple first interoperability rules, wherein the first smart home device does not belong to the multiple smart home devices, and to generate prompt information of purchase information of the first smart home device; or to generate, based on the multiple first interoperability rules, prompt information that accuracy in an application scenario corresponding to the installation package to be loaded will be reduced.

Alternatively, the processor is further configured to obtain state information of multiple condition devices, to determine the at least one interoperability rule by inquiring a list of interoperability rules in an active state based on the state information of the multiple condition devices, and to control multiple response devices based on the at least one interoperability rule.

The above one or more technical solutions according to the embodiments of the present disclosure have at least one or more technical effects and advantages as follows.

In the technical solutions according to the embodiments of the present disclosure, a user can load many required interoperability rules at a time, and after the interoperability rules are loaded, these interoperability rules are automatically set as rules required to be executed. Therefore, compared with the technical solution in related art that a user can only set interoperability rules one by one, the technical solutions of the present disclosure can effectively solve the technical problem in the related art that the efficiency of setting interoperability rules is low, thereby achieving the technical effect of improving the efficiency of setting interoperability rules.

DETAILED DESCRIPTION

The embodiments of the present disclosure provide an information processing method and an electronic device, to solve the technical problem in the related art that the efficiency of setting interoperability rules is low, thereby achieving the technical effect of improving the efficiency of setting interoperability rules.

In the technical solutions according to the embodiments of the present disclosure, in order to solve the above technical problem, the general concept is as follows. A method for generating interoperability rules comprises presetting multiple interoperability rules; selecting at least one interoperability rule from the multiple interoperability rules; loading the at least one interoperability rule; and controlling multiple smart home devices connected to a smart controller based on the at least one interoperability rule.

As in the technical solutions according to the embodiments of the present disclosure, a user can load multiple required interoperability rules at a time and automatically set these interoperability rules as rules required to be executed after the rules are loaded, compared with the technical solution in the related art that a user can only set interoperability rules one by one, the above technical solutions of the present disclosure can effectively solve the technical problem in the related art that the efficiency of setting interoperability rules is low, thereby achieving the technical effect of improving the efficiency of setting interoperability rules.

In order to better understand the above technical solutions, the technical solutions of the present disclosure will be described in detail below in conjunction with accompanying drawings and specific embodiments. It should be understood that the embodiments of the present disclosure and the specific features in the embodiments are used to explain the technical solutions of the present disclosure in detail, instead of limiting the technical solutions of the present disclosure. Without a conflict, the embodiments of the present disclosure and the technical features in the embodiments can be combined with each other.

Before the information processing method according to the embodiments of the present disclosure is described in detail, the electronic device corresponding to the method will be basically described. The smart controller according to the embodiments of the present disclosure may be a gateway, a smart router, a cloud device, or another smart controller having a certain processing function or the like.

First Embodiment

In order to enable those skilled in the art to clearly and completely understand the technical solutions according to the embodiments of the present disclosure, the technical solutions will be described in the following specific description by taking the electronic device being a smart controller having a processing function as an example. The specific process of implementing the method according to the embodiment of the present disclosure will be described below in conjunction with examples.

Figure 1:
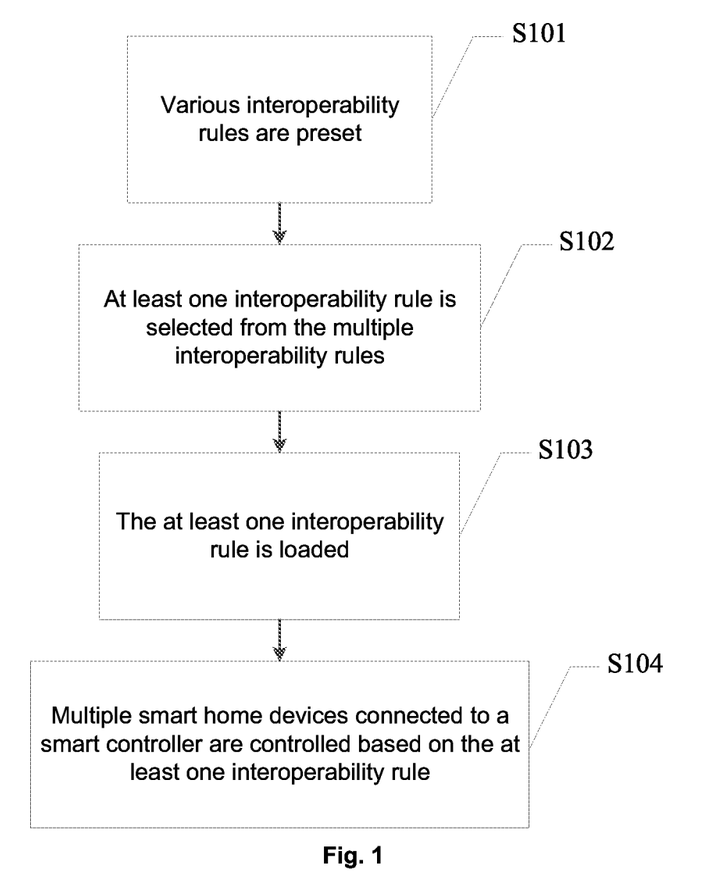
FIG. 1 is a flowchart of a method for generating interoperability rules according to an embodiment of the present disclosure.
Figure 10:
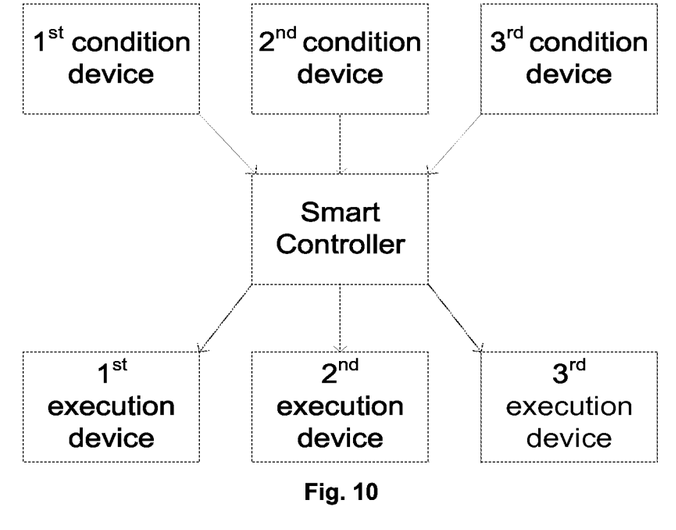
FIG. 10 is a diagram of a condition device, an execution device, and a smart controller according to an embodiment of the present disclosure.

With reference to FIGS. 1 and 10, a specific process of implementing the method for generating interoperability rules is provided and described in the first embodiment of the present disclosure. The method comprises the following steps.

In S101, multiple interoperability rules are preset.

In S102, at least one interoperability rule is selected from the multiple interoperability rules.

In S103, the at least one interoperability rule is loaded.

In S104, multiple smart home devices connected to a smart controller are controlled based on the at least one interoperability rule.

Figure 2:
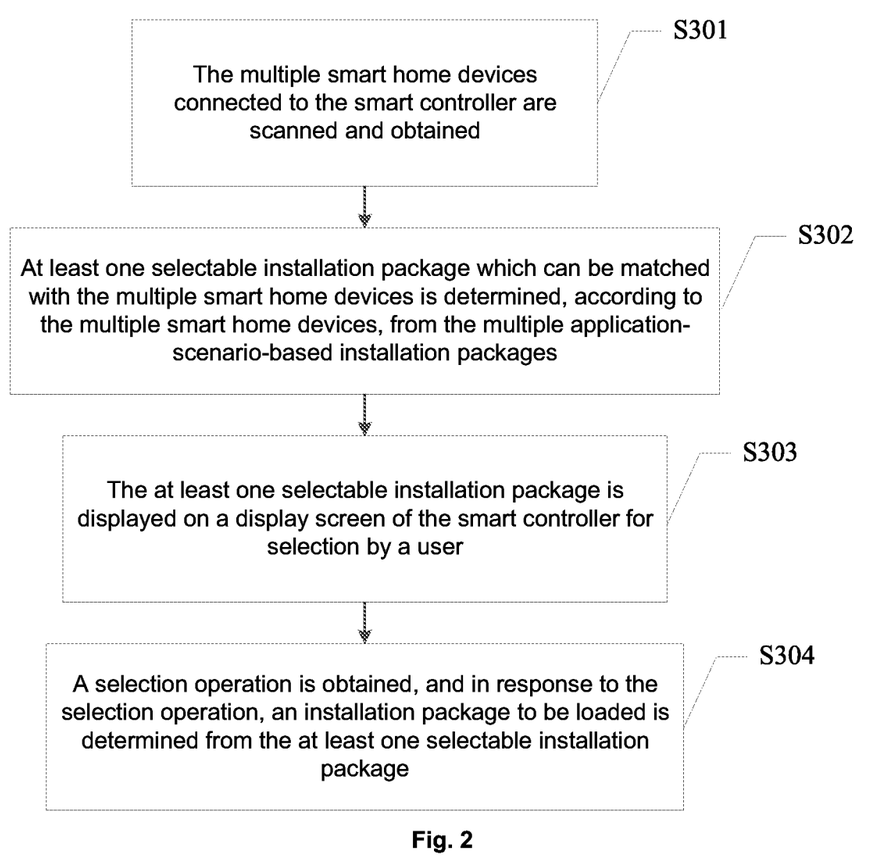
FIG. 2 is a specific flowchart of implementing step S102 in a first case of the method for generating interoperability rules according to an embodiment of the present disclosure.

Further, in a first case, with reference to FIG. 2, a specific process of implementing step S102 specifically comprises the following steps.

In S301, the multiple smart home devices connected to the smart controller are scanned and obtained.

In S302, at least one selectable installation package which can be matched with the multiple smart home devices is determined, according to the multiple smart home devices, from the multiple application-scenario-based installation packages.

In S303, the at least one selectable installation package is displayed on a display screen of the smart controller for selection by a user.

In S304, a selection operation is obtained and in response to the selection operation, an installation package to be loaded is determined from the at least one selectable installation package.

Figure 3:
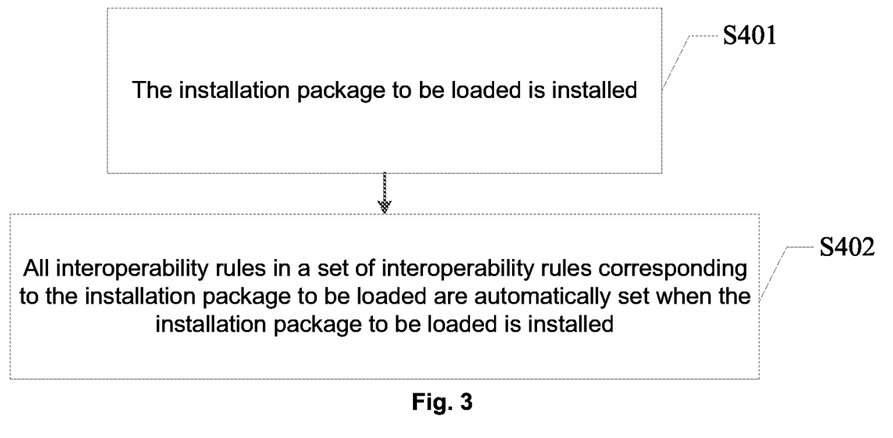
FIG. 3 is a specific flowchart of implementing step S103 in the first case of the method for generating interoperability rules according to an embodiment of the present disclosure.

Further, with reference to FIG. 3, a specific process of implementing step S103 specifically comprises the following steps.

In S401, the installation package to be loaded is installed.

In S402, all interoperability rules in a set of interoperability rules corresponding to the installation package to be loaded are automatically set after the installation package to be loaded is installed. After the selected installation package is installed, the executable program of the control function provided by the selected installation package is in an activated state. In other words, the executable program of the control function provided by the selected installation package may be invoked or responded to by the smart controller.

Figure 4:
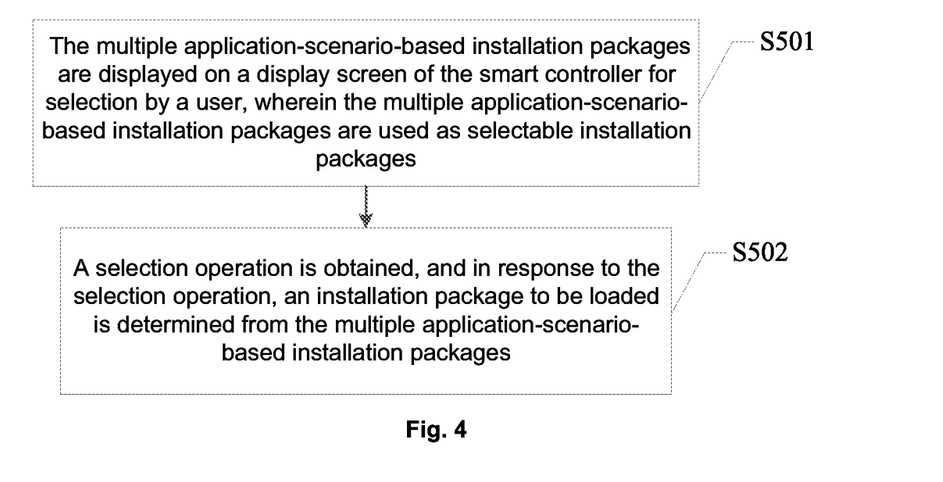
FIG. 4 is a specific flowchart of implementing step S102 in a second case of the method for generating interoperability rules according to an embodiment of the present disclosure.

Further, in a second case, with reference to FIG. 4, a specific process of implementing step S102 specifically comprises the following steps.

In S501, the multiple application-scenario-based installation packages are displayed on a display screen of the smart controller for selection by a user, wherein the multiple application-scenario-based installation packages are used as selectable installation packages.

In S502, a selection operation is obtained, and in response to the selection operation, an installation package to be loaded is determined from the multiple application-scenario-based installation packages.

Figure 5:
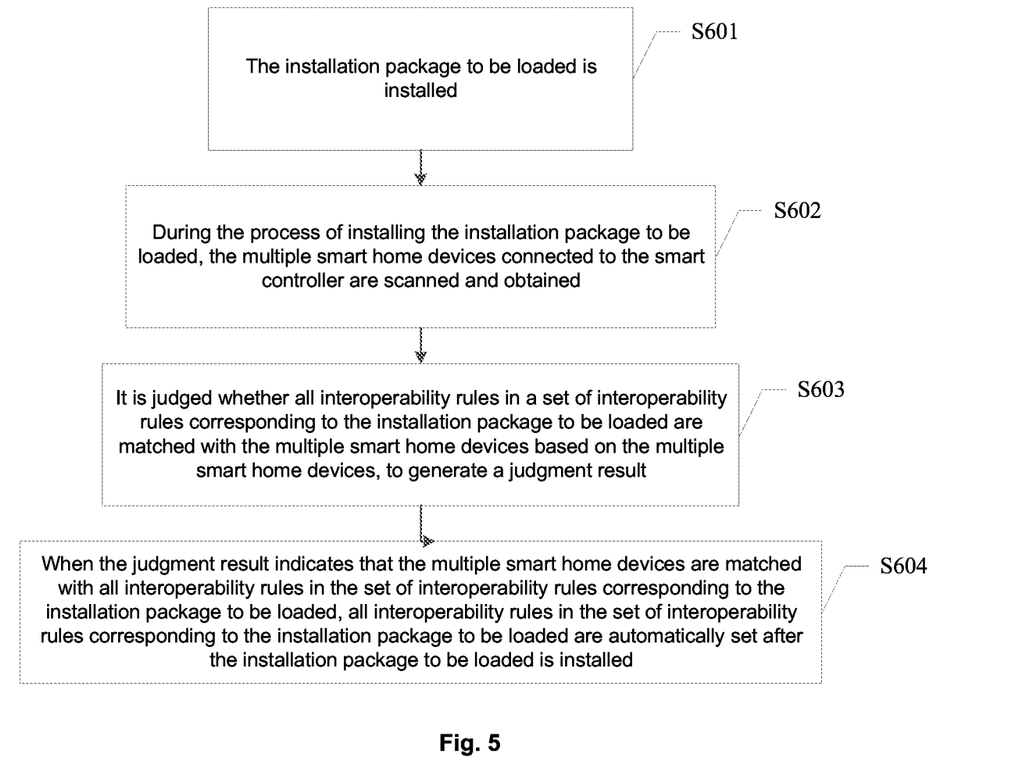
FIG. 5 is a specific flowchart of implementing step S103 in the second case of the method for generating interoperability rules according to an embodiment of the present disclosure.

Further, with reference to FIG. 5, a specific process of implementing step S103 specifically comprises the following steps.

In S601, the installation package to be loaded is installed.

In S602, during the process of installing the installation package to be loaded, the multiple smart home devices connected to the smart controller are scanned and obtained.

In S603, it is judged whether all interoperability rules in a set of interoperability rules corresponding to the installation package to be loaded are matched with the multiple smart home devices based on the multiple smart home devices, to generate a judgment result.

In S604, when the judgment result indicates that the multiple smart home devices are matched with all interoperability rules in the set of interoperability rules corresponding to the installation package to be loaded, all interoperability rules in the set of interoperability rules corresponding to the installation package to be loaded are automatically set after the installation package to be loaded is installed.

Figure 6:
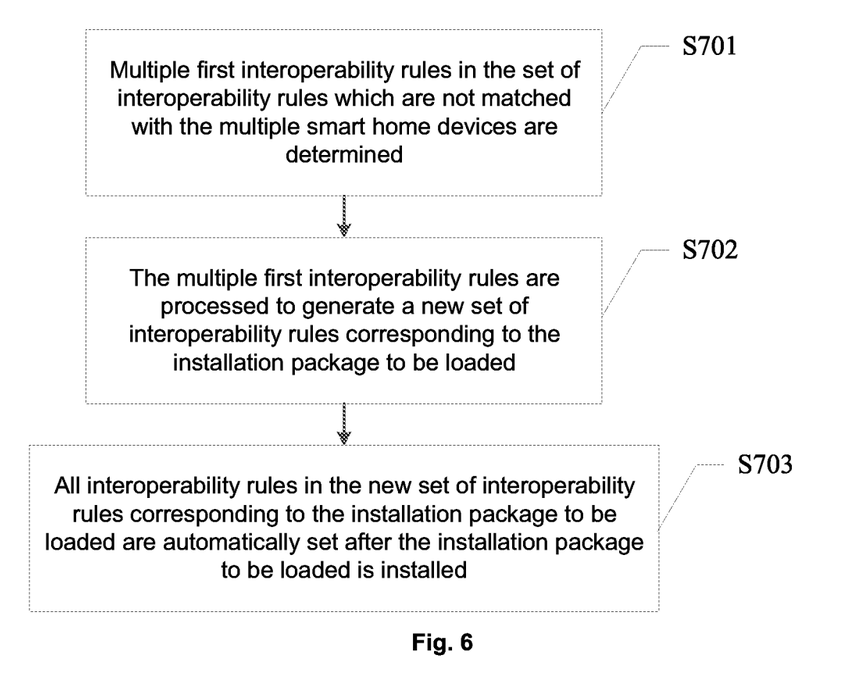
FIG. 6 is a specific flowchart of implementing a first implementation when not all of the interoperability rules in a set of interoperability rules corresponding to an installation package to be loaded are matched with multiple smart home devices in the second case of the method for generating interoperability rules according to an embodiment of the present disclosure.

Further, with reference to FIG. 6, after step S603 is performed, when the judgment result indicates that not all of the interoperability rules in the set of interoperability rules corresponding to the installation package to be loaded are matched with the multiple smart home devices, the method comprises the following steps.

In S701, multiple first interoperability rules in the set of interoperability rules which are not matched with the multiple smart home devices are determined.

In S702, the multiple first interoperability rules are processed to generate a new set of interoperability rules corresponding to the installation package to be loaded.

In S703, all interoperability rules in the new set of interoperability rules corresponding to the installation package to be loaded are automatically set after the installation package to be loaded is installed.

Figure 7:
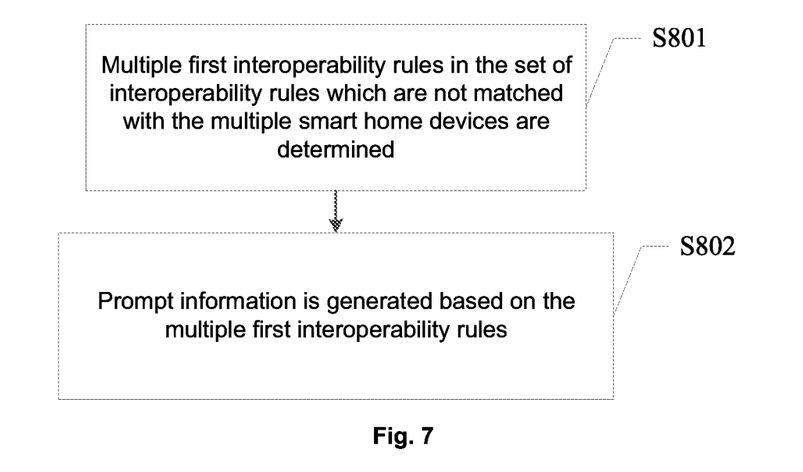
FIG. 7 is a specific flowchart of implementing a second implementation when not all of the interoperability rules in a set of interoperability rules corresponding to an installation package to be loaded are matched with multiple smart home devices in the second case of the method for generating interoperability rules according to an embodiment of the present disclosure.

Further, with reference to FIG. 7, after step S603 is performed, when the judgment result indicates that not all of the interoperability rules in the set of interoperability rules corresponding to the installation package to be loaded are matched with the multiple smart home devices, the method comprises the following steps.

In S801, multiple first interoperability rules in the set of interoperability rules which are not matched with the multiple smart home devices are determined.

In S802, prompt information is generated based on the multiple first interoperability rules.

Figure 8:
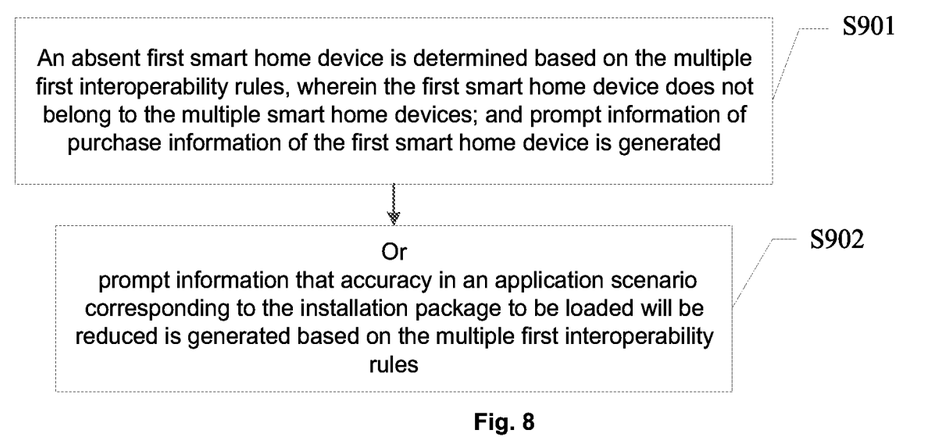
FIG. 8 is a specific flowchart of implementing step S802 in the second case of the method for generating interoperability rules according to an embodiment of the present disclosure.

Further, with reference to FIG. 8, a specific process of implementing step S802 comprises the following steps.

In S901, an absent first smart home device is determined based on the multiple first interoperability rules, wherein the first smart home device does not belong to the multiple smart home devices; and prompt information of purchase information of the first smart home device is generated; or in S902, prompt information that accuracy in an application scenario corresponding to the installation package to be loaded will be reduced is generated based on the multiple first interoperability rules.

Figure 9:
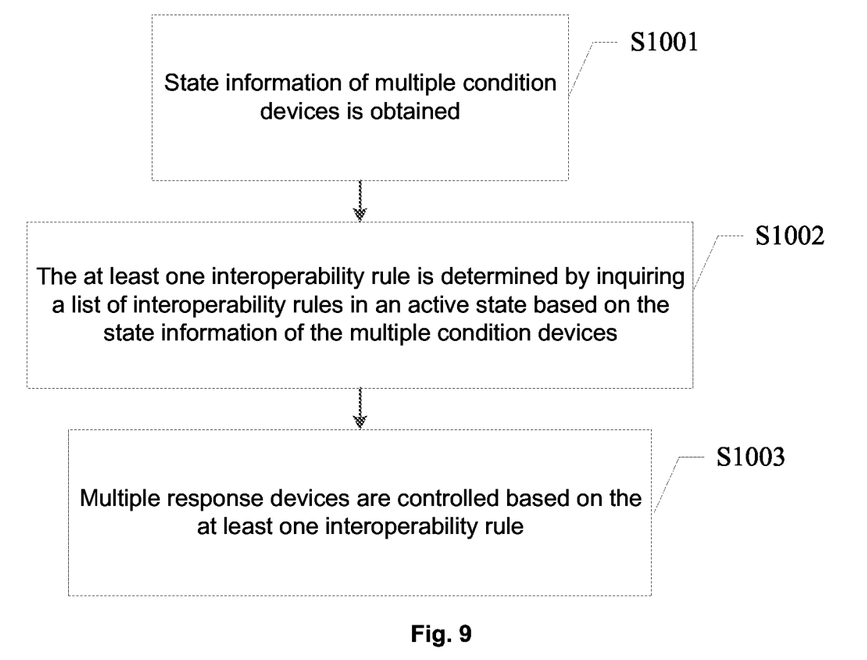
FIG. 9 is a specific flowchart of implementing step S104 of the method for generating interoperability rules according to an embodiment of the present disclosure.

No matter whether in the first case or in the second case, with reference to FIG. 9, a specific process of implementing step S104 comprises the following steps.

In S1001, state information of multiple condition devices is obtained.

In S1002, the at least one interoperability rule is determined by inquiring a list of interoperability rules in an active state based on the state information of the multiple condition devices.

In S1003, multiple response devices are controlled based on the at least one interoperability rule.

The specific process of implementing the information processing method according to the embodiments of the present disclosure will be described below by way of specific examples.

Smart home devices at home are connected together by a user via a smart controller, to achieve the purpose of controlling smart home devices through interoperability rules. In the smart home devices, condition devices may comprise a door, a window, a humidifier, an air conditioner or the like; and execution devices may comprise an air conditioner, a refrigerator, a light or the like, or devices which can respond to state parameters in the environments described above, which will not be described here in detail.

In the embodiments of the present disclosure, there may be many smart controllers, for example, a processor having a processing function, a cloud device, or a smart hub similar to a router.

The smart controller may be a processor which may be connected to smart home devices. There are condition devices and execution devices included in the smart home devices. The processor may control the execution devices according to states of the condition devices connected to the processor itself. In an example, a door and an air conditioner are connected to a smart controller. When the door is closed, a state signal which may represent a current state is transmitted by the door to notify the smart controller. After obtaining the state signal, the smart controller finally controls the air conditioner to turn on through an interoperability rule, i.e., "if the door is closed, the air conditioner is turned on".

Of course, the smart controller may also be a cloud device, i.e., the interoperability rules may be stored on the cloud server of the smart controller. Still by taking the above example, when the door is closed, a state signal which may represent a current state is transmitted by the door to the smart controller. After obtaining the signal, the smart controller transmits the signal to the cloud server. The cloud server generates a signal for controlling the air conditioner to turn on using the interoperability rules stored on the cloud server, and then transmits the signal to the air conditioner to control the air conditioner to turn on.

In addition, the smart controller may also be a hub device similar to a smart router. Still by taking the above example, when the door is closed, a state signal which may represent a current state is transmitted by the door to the smart controller. The smart controller identifies that the signal is transmitted by the door, and the transmitted state signal indicates that the door is closed. Then, the smart controller generates a signal representing that the door is in a closed state to notify the cloud device. After receiving the signal, the cloud device generates a control signal for controlling the air conditioner to turn on using the control rules stored on the cloud device. Then, the control signal is transmitted to the smart controller. The smart controller identifies that an objected to be controlled by the signal is an air conditioner and the control command in the signal is to turn on the air conditioner. Then, the smart controller transmits the control command for turning on the air conditioner to the air conditioner.

Preferably, the cloud device may implement data synchronization with the smart controller, i.e., the control rules stored on the cloud device are transmitted to the smart controller at the same time. Thus, when a fault occurs in one of the cloud device and the smart controller, the other one can achieve the function of controlling the smart home device. In this way, higher operation security is achieved.

In the embodiments of the present disclosure, a format of the interoperability rule may be that when the door is closed, the air conditioner is turned on. Of course, there is not just one interoperability rule in real life. Instead, there may be many interoperability rules, and may be different according to different scenarios set by users, as shown in tables 1-3 below.

TABLE 1 a set of interoperability rules in a sleep scenario
(first set of interoperability rules)

| Condition devices | Interoperability rules | Execution devices |
|---|---|---|
| door; window | If the door is closed and the window is closed, the air conditioner is turned on | air conditioner |
| door; window | if the door is open and the window is open, the air conditioner is turned off | air conditioner |
| light | if the light is turned off, the sound is turned on and the humidifier is turned on | sound; humidifier |
| light | if the light is turned on, the sound is turned off and the humidifier is turned off | sound; humidifier |

TABLE 2 a set of interoperability rules in a fitness scenario
(second set of interoperability rules)

| Condition devices | Interoperability rules | Execution devices |
|---|---|---|
| treadmill | if the treadmill is turned on, the air conditioner is turned on and the sound is turned on | air conditioner; sound |
| treadmill | if the treadmill is turned off, the air conditioner is turned off and the sound is turned off | air conditioner; sound |

TABLE 3 a set of interoperability rules in a read scenario
(third set of interoperability rules)

| Condition devices | Interoperability rules | Execution devices |
|---|---|---|
| light | if the light is turned on, the window is closed | window |
| light | if the light is turned off, the window is open | window |
| air conditioner; door | if the air conditioner is turned on and the door is closed, the sound is turned on and the humidifier is turned on | sound; humidifier |
| air conditioner; door | if the air conditioner is turned off and the door is open, the sound is turned off and the humidifier is turned off | sound; humidifier |

Those skilled in the art may encapsulate the sets of interoperability rules in the above tables 1-3 into 3 different preset sets of interoperability rules, which are numbered as first to third sets of interoperability rules. That is, step S101 of presetting multiple interoperability rules is performed. Specifically, a cloud device having multiple preset interoperability rules is connected to the smart controller, and the smart controller has image files of the preset multiple interoperability rules. A user may select required interoperability rules, and the rules may be directly transmitted by the cloud device to the smart controller. For example, the user selects the first set of interoperability rules, and the first set of interoperability rules is directly transmitted by the cloud device to the smart controller for storage. Alternatively, the multiple interoperability rules may be directly stored in a local storage of the smart controller for use by a user without a connection with the cloud device. In addition, those skilled in the art may set the sets of interoperability rules as multiple different packages in different scenarios according to the specific interoperability rules. For example, the first set of interoperability rules is set as a first package, the second set of interoperability rules is set as a second package, and the third set of interoperability rules is set as a third package. Also, in the present embodiment, it is assumed the preset 3 packages described above are stored locally, i.e., in the storage of the smart controller.

After S101 is performed, step S102 is performed. In step S102, at least one interoperability rule is selected from the multiple interoperability rules. Still by taking the above example, a user may select a package required for himself/herself from the above 3 packages. In other words, the user may set the interoperability rules by selecting from respective identities of scenarios (for example, identities of sleep, read, and fitness scenarios or the like) corresponding to the above 3 packages. That is, based on an identity of a scenario selected by the user, the smart controller sets multiple or more than two interoperability rules in the corresponding scenario.

In the embodiment of the present disclosure, at least one interoperability rule may refer to only one interoperability rule. For example, if a user selects to generate only one interoperability rule, the interoperability rule is a control rule for controlling responses from multiple execution devices according to states of multiple condition devices. For example, as shown in table 3, the condition devices are a door and an air conditioner, the execution devices are a sound and a humidifier, and the control rule is "if the air conditioner is turned on and the door is closed, the sound is turned on and the humidifier is turned on". Thus, when a user is reading books, after the user closes the door and turns the air conditioner on, the sound is turned on in response to the interoperability rule. Of course, some light music for helping the user to relieve pressure may be preset in the sound, so that the user can better enjoy the joy of reading. At the same time, the humidification function of the humidifier is also enabled in response to the interoperability rule, so as to provide a comfortable reading environment to the user.

Of course, the at least one interoperability rule may also refer to two or more interoperability rules.

The interoperability rule may be set to control one execution device for one condition device. For example, as shown in table 3, the condition device is a light, the execution device is a window, and the interoperability rules are "if the light is turned on, the window is closed", and "if the light is turned off, the window is open".

Alternatively, the interoperability rule may be set to control two or more execution devices for one condition device. For example, as shown in table 2, the condition device is a treadmill, the execution devices are an air conditioner and a sound, and the interoperability rules are "if the treadmill is turned on, the air conditioner is turned on and the sound is turned on" and "if the treadmill is turned off, the air conditioner is turned off and the sound is turned off".

Alternatively, the interoperability rule may be set to control one execution device for two or more condition devices. For example, as shown in table 1, the condition devices are a door and a window, the execution device is an air conditioner, and the interoperability rules are "if the door is closed and the window is closed, the air conditioner is turned on" and "if the door is open and the window is closed, the air conditioner is turned off".

Of course, the interoperability rule may also be set to control two or more execution devices for two or more condition devices. For example, as shown in table 3, the condition devices are a door and an air conditioner, the execution devices are a sound and a humidifier, and the control rules are "if the air conditioner is turned on and the door is closed, the sound is turned on and the humidifier is turned on" and "if the air conditioner is turned off and the door is open, the sound is turned off and the humidifier is turned off".

In the embodiments of the present disclosure, when step S102 is specifically performed, there may be two cases as follows.

In a first case, when step S102 is performed, step S301 is specifically performed. In step S301, the multiple smart home devices connected to the smart controller are scanned and obtained. Still by taking the above example, the smart controller firstly scans smart home devices which are connected thereto. It is assumed that the smart home devices connected to the smart controller are a light, a window, a sound, an air conditioner, a door, and a treadmill.

After step S301 is performed, step S302 is performed. In step S302, at least one selectable installation package which can be matched with the multiple smart home devices is determined, according to the multiple smart home devices, from the multiple application-scenario-based installation packages. Still by taking the above example, the smart home devices which are referred to in the above 3 packages comprise a door, a window, a sound, an air conditioner, a door, a treadmill, and a humidifier, as shown in the above tables 1-3. When scanning is performed in step S301, it is found that only the light, the window, the sound, the air conditioner, the door and the treadmill in the above smart home devices are connected to the smart controller. Thus, it can be determined from table 1 and 3 that the humidifier in the first package and the third package is not connected to the smart controller. Therefore, the smart controller may determine that an installation package which is selectable by a user is specifically the second package.

After step S302 is performed, step S303 is performed. In step S303, the at least one selectable installation package is displayed on a display screen of the smart controller for selection by a user. Still by taking the above example, in this case, the smart controller may display the second package on the display screen for selection by the user.

Preferably, if there are many packages which are selectable by a user, the smart controller may further briefly describe the interoperability rules included in each package for the user according to application scenarios, to prompt the user of a kind of the package and a specific function of the package or the like.

After step S303 is performed, step S304 is performed. In step S304, a selection operation is obtained and an installation package to be loaded is determined from the at least one selectable installation package in response to the selection operation. Still by taking the above example, the smart controller responds to the selection operation of the user. It is assumed that the user selects the second package, and the smart controller determines the package as a required installation package to be loaded.

After step S304 is performed, step S103 is performed. In step S103, the at least one interoperability rule is loaded. More specifically, in the first case, the smart controller performs step S401. In step S401, the installation package to be loaded is installed. Still by taking the above example, the smart controller installs the second package according to the installation steps set by itself, for example, allocation of installation paths, configuration of installation files, or the like.

After step S401 is performed, step S402 is performed. In step S402, all interoperability rules in a set of interoperability rules corresponding to the installation package to be loaded are automatically set after the installation package to be loaded is installed. Still by taking the above example, after the smart controller installs the above package, the interoperability rules in the package are loaded into an execution list of the smart controller, and the smart controller may control responses from other smart home devices according to the specific execution list. The specific execution rules are consistent with the interoperability rules in table 2, and will not be described here in detail.

Of course, in addition to the first case described above, when step S102 is performed, a second case may occur. Specifically, when step S102 is performed, the smart controller specifically performs step S501. In step S501, the multiple application-scenario-based installation packages are displayed on a display screen of the smart controller for selection by a user, wherein the multiple application-scenario-based installation packages are used as selectable installation packages. Still by taking the above example, after the above 3 sets of interoperability rules are preset in the smart controller, the 3 sets of interoperability rules may be firstly encapsulated into 3 installation packages, i.e., the first set of interoperability rules is a first package, the second set of interoperability rules is a second package, and the third set of interoperability rules is a third package. Then, the 3 packages are displayed on the display screen of the smart controller for selection by a user.

Preferably, the smart controller may provide a brief description to a user according to specific application scenarios of the 3 packages, to prompt the user of a function of each package and a relatively suitable application scenario or the like.

After step S501 is performed, step S502 is performed. In step S502, a selection operation is obtained, and in response to the selection operation, an installation package to be loaded is determined from the multiple application-scenario-based installation packages. Still by taking the above example, a user may select a required package according to practical conditions. For example, if a user considers that the third package is suitable for him/her, the user may select the package.

After step S502 is performed, step S103 is performed. In step S103, the at least one interoperability rule is loaded. More specifically, in the second case, the smart controller performs step S601. In step S601, the installation package to be loaded is installed. Still by taking the above example, the smart controller installs the third package according to the installation steps set by itself, for example, allocation of installation paths, configuration of installation files or the like.

After step S601 is performed, step S602 is performed. In step S602, during the process of installing the installation package to be loaded, the multiple smart home devices connected to the smart controller are scanned and obtained. Still by taking the above example, when the above two packages are loaded and installed, the smart controller scans smart home devices connected thereto. It is assumed that the smart home devices connected to the smart controller are a light, a window, a sound, an air conditioner, a door, and a treadmill.

After step S602 is performed, step S603 is performed. In step S603, it is judged, based on the multiple smart home devices, whether all interoperability rules in the set of interoperability rules corresponding to the installation package to be loaded are matched with the multiple smart home devices, to generate a judgment result. Still by taking the above example, it is judged, based on the control rules referred to in the above package, which are consistent with the interoperability rules in table 3, whether the control rules of the smart controller for controlling the smart home devices thereto are matched with the above smart home devices. Obviously, the smart home devices are completely matched with all control rules which are installed for the smart home devices.

After step S603 is performed, step S604 is performed. In step S604, when the judgment result indicates that the multiple smart home devices are matched with all interoperability rules in the set of interoperability rules corresponding to the installation package to be loaded, all interoperability rules in the set of interoperability rules corresponding to the installation package to be loaded are automatically set after the installation package to be loaded is installed. Still by taking the above example, after the smart controller installs the interoperability rules, the interoperability rules are loaded into an execution list of the smart controller. In this case, the smart controller may control the smart home devices through the execution list.

Of course, if the following smart home devices are connected to the smart controller, i.e., a light, a window, a sound, an air conditioner, and a door, and the third package is also selected, the smart controller performs steps S601 to step S603 in turn as described above. When step S603 is performed, as the third package comprises a humidifier, but this smart home device is actually not connected to the smart controller, after performing step S603, the smart controller performs step S701. In step S701, multiple first interoperability rules in the set of interoperability rules which are not matched with the multiple smart home devices are determined. Still by taking the above example, it may be determined from table 3 that two rules are not matched, i.e., "if the air conditioner is turned on and the door is closed, the sound is turned on and the humidifier is turned on" and "if the air conditioner is turned off and the door is open, the sound is turned off and the humidifier is turned off".

After step S701 is performed, step S702 is performed. In step S702, the multiple first interoperability rules are processed to generate a new set of interoperability rules corresponding to the installation package to be loaded. Still by taking the above example, the smart controller may process the above control rules which are not matched, for example, delete or modify the control rules. For example, the interoperability rule of "if the air conditioner is turned on and the door is closed, the sound is turned on and the humidifier is turned on" may be modified as "if the air conditioner is turned on and the door is closed, the sound is turned on", and the interoperability rule of "if the air conditioner is turned off and the door is open, the sound is turned off and the humidifier is turned off" may be correspondingly modified as "if the air conditioner is turned off and the door is open, the sound is turned off". Of course, the control rules may also be processed in other manners which are easily reached by those skilled in the art, which is not limited in the present disclosure. In this case, the smart controller modifies the interoperability rules, and the details may be known with reference to table 5.

TABLE 5

Modified third package

| Condition devices | Interoperability rules | Execution devices |
| --- | --- | --- |
| light | if the light is turned on, the window is closed | window |
| light | if the light is turned off, the window is open | window |
| air conditioner; door | if the air condtioner is turned on and the door is open, the sound is turned on | sound |
| air conditioner; door | if the air condtioner is turned off and the door is open, the sound is turned off | sound |

After step S702 is performed, step S703 is performed. In step S703, all interoperability rules in the new set of interoperability rules corresponding to the installation package to be loaded are automatically set after the installation package to be loaded is installed. Still by taking the above example, after the smart controller installs the above package, the interoperability rules in the package are loaded into an execution list of the smart controller, and the smart controller may control responses from other smart home devices according to the specific execution list. The specific execution rules are consistent with the rules in table 5, and will not be described here in detail.

Of course, when it is judged that the smart home devices connected to the smart controller are not matched with the interoperability rules in the set of interoperability rules in the package to be loaded, in addition to processing the interoperability rules as described above in steps S701 to step S703, step S801 may further be performed. In step S801, multiple first interoperability rules in the set of interoperability rules which are not matched with the multiple smart home devices are determined. Still by taking the above example, it may determine from table 2 described above that the interoperability controls in the package which are not matched with the smart home devices are "if the air conditioner is turned on and door is closed, the sound is turned on and the humidifier is turned on", and "if the air conditioner is turned off and the door is open, the sound is turned off and the humidifier is turned off".

After step S801 is performed, step S802 is performed. In step S802, prompt information is generated based on the multiple first interoperability rules. More specifically, the smart controller performs step S901 or step S902. In step S901, an absent first smart home device is determined based on the multiple first interoperability rules, wherein the first smart home device does not belong to the multiple smart home devices; and prompt information of purchase information of the first smart home device is generated. In step S902, prompt information that accuracy in an application scenario corresponding to the installation package to be loaded will be reduced is generated based on the multiple first interoperability rules. Still by taking the above example, it may be determined from table 3 and the smart home devices connected to the smart controller that there is currently no humidifier connected to the smart controller. In this case, the smart controller may prompt the user whether it needs to purchase a humidifier and may recommend a brand name to the user so as to instruct the user to purchase the humidifier; or may prompt the user that if the above device is not purchased, the user accuracy will be reduced.

No matter whether in the first case or in the second case, after step S103 is performed, step S104 is performed. In step S104, multiple smart home devices connected to the smart controller are controlled based on the at least one interoperability rule. More specifically, the smart controller performs step S1001. In step S1001, state information of multiple condition devices is obtained. Still by taking the above example, it is assumed that the air condition is in an on state, the door is in an open state, and the smart controller may obtain the states of the above condition devices.

After step S1001 is performed, step S1002 is performed. In step S1002, the at least one interoperability rule is determined by inquiring a list of interoperability rules in an active state based on the state information of the multiple condition devices. Still by taking the above example, if the interoperability rules in the execution list of the smart controller are the third package, the interoperability rules in table 3 are in an active state, and responses from the multiple smart home devices may be controlled through the above interoperability rules. In this case, it is determined, based on the states of the above condition devices and the interoperability rules in table 3, that the used interoperability rule is "if the air conditioner is turned on and the door is closed, the sound is turned on and the humidifier is turned on".

After step S1002 is performed, step S1003 is performed. In step S1003, multiple response devices are controlled based on the at least one interoperability rule. Still by taking the above example, according to the above two control rules, the smart controller controls the sound to turn on and controls the humidifier to implement a humidification operation.

Second Embodiment

Figure 11:
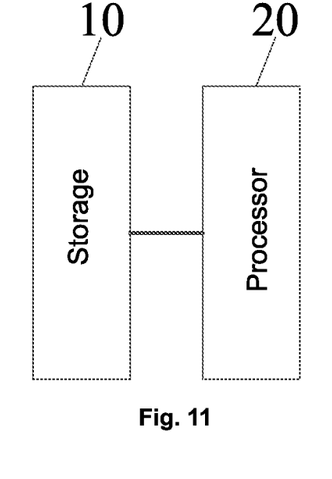
FIG. 11 is a structural diagram of an electronic device according to an embodiment of the present disclosure.

With reference to FIG. 11, in the embodiment of the present disclosure, an electronic device is provided based on the same inventive concept. The electronic device specifically comprises: a storage 10 configured to preset multiple interoperability rules; a processor 20 configured to select at least one interoperability rule from the multiple interoperability rules, load the at least one interoperability rule, and control multiple smart home devices connected to the smart controller based on the at least one interoperability rule.

Alternatively, the storage 10 is configured to preset multiple interoperability rules by pre-storing multiple application-scenario-based installation packages, wherein each installation package is a set of interoperability rules comprising one or more interoperability rules. When each of the multiple application-scenario-based installation packages is stored in the storage, the each application-scenario-based installation package is one installation file in the storage, and the executable program of the control function provided by the each application-scenario-based installation package is in a stored state or a linked state. In other words, the executable program of the control function provided by the each application-scenario-based installation package cannot be invoked or responded to by the smart controller.

Alternatively, the processor 20 is further configured to scan and obtain the multiple smart home devices connected to the smart controller,
determine, according to the multiple smart home devices, at least one selectable installation package which can be matched with the multiple smart home devices from the multiple application-scenario-based installation packages, display the at least one selectable installation package on a display screen of the smart controller for selection by a user, obtain a selection operation, and determine, in response to the selection operation, an installation package to be loaded from the at least one selectable installation package.

Alternatively, the processor 20 is further configured to install the installation package to be loaded, and automatically set all interoperability rules in a set of interoperability rules corresponding to the installation package to be loaded when the installation package to be loaded is installed.

Alternatively, the processor 20 is further configured to display the multiple application-scenario-based installation packages on a display screen of the smart controller for selection by a user, wherein the multiple application-scenario-based installation packages are used as selectable installation packages, obtain a selection operation, and determine, in response to the selection operation, an installation package to be loaded from the multiple application-scenario-based installation packages.

Alternatively, the processor 20 is further configured to install the installation package to be loaded, scan and obtain the multiple smart home devices connected to the smart controller during the process of installing the installation package to be loaded, judge, based on the multiple smart home devices, whether all interoperability rules in the set of interoperability rules corresponding to the installation package to be loaded are matched with the multiple smart home devices, to generate a judgment result, and automatically set all interoperability rules in the set of interoperability rules corresponding to the installation package to be loaded after the installation package to be loaded is installed when the judgment result indicates that the multiple smart home devices are matched with all interoperability rules in the set of interoperability rules corresponding to the installation package to be loaded.

Alternatively, the processor 20 is further configured to determine multiple first interoperability rules in the set of interoperability rules which are not matched with the multiple smart home devices when the judgment result indicates that not all of the interoperability rules in the set of interoperability rules corresponding to the installation package to be loaded are matched with the multiple smart home devices, process the multiple first interoperability rules to generate a new set of interoperability rules corresponding to the installation package to be loaded, and automatically set all interoperability rules in the new set of interoperability rules corresponding to the installation package to be loaded after the installation package to be loaded is installed.

Alternatively, the processor 20 is further configured to determine multiple first interoperability rules in the set of interoperability rules which are not matched with the multiple smart home devices when the judgment result indicates that not all of the interoperability rules in the set of interoperability rules corresponding to the installation package to be loaded are matched with the multiple smart home devices, and generate prompt information based on the multiple first interoperability rules.

Alternatively, the processor 20 is further configured to determine an absent first smart home device based on the multiple first interoperability rules, wherein the first smart home device does not belong to the multiple smart home devices, and generate prompt information of purchase information of the first smart home device; or generate, based on the multiple first interoperability rules, prompt information that accuracy in an application scenario corresponding to the installation package to be loaded will be reduced.

Alternatively, the processor 20 is further configured to obtain state information of multiple condition devices, determine the at least one interoperability rule by inquiring a list of interoperability rules in an active state based on the state information of the multiple condition devices, and control multiple response devices based on the at least one interoperability rule.

The electronic device described above corresponds to the information processing method described above one by one, and therefore will not be described here in detail.

The one or more technical solutions according to the embodiments of the present disclosure can achieve one or more technical effects as follows.

In the technical solutions according to the embodiments of the present disclosure, a user can load many required interoperability rules at a time, and after the interoperability rules are loaded, these interoperability rules are automatically set as rules required to be executed. Therefore, compared with the technical solution in related art that a user can only set interoperability rules one by one, the technical solutions of the present disclosure can effectively solve the technical problem in the related art that the efficiency of setting interoperability rules is low, thereby achieving the technical effect of improving the efficiency of setting interoperability rules.

Those skilled in the art should appreciate that the embodiments of the present disclosure can be provided as methods, systems, or computer program products. Therefore, forms such as hardware-only embodiments, software-only embodiments, or embodiments combining software and hardware can be used in the present disclosure. In addition, forms such as a computer program product which is implemented on one or more of computer usable storage media (comprising but not limited to a disk memory, a CD-ROM, an optical memory etc.) with computer usable program codes can be used in the present disclosure.

The present disclosure is described with reference to the flowcharts and/or block diagrams of the methods, devices (systems) and computer program products according to the embodiments of the present disclosure. It should be understood that each flow and/or block in the flowcharts and/or block diagrams as well as a combination of the flows and/or blocks in the flowcharts and/or block diagrams can be implemented by computer program instructions. These computer program instructions can be provided to a processor of a general-purpose computer, a dedicated-purpose computer, an embedded processor, or other programmable data processing devices to generate a machine. Thereby, the instructions executed by the processor of the computer or other programmable data processing devices generate means for implementing functions specified in one or more flows in the flowcharts and/or one or more blocks in the block diagrams.

These computer program instructions can also be stored in a computer readable memory capable of introducing a computer or other programmable data processing devices to operate in a particular mode. Thereby, the instructions stored in the computer readable memory generate an article of manufacture comprising instruction means for implementing functions specified in one or more flows in the flowcharts and/or one or more blocks in the block diagrams.

These computer program instructions can also be loaded onto a computer or other programmable data processing devices, so as to enable a series of operation steps to be performed on the computer or other programmable devices to generate a computer-implemented process. Thereby, the instructions executed on the computer or other programmable devices provide a step of implementing functions specified in one or more flows in the flowcharts and/or one or more blocks in the block diagrams.

Specifically, computer program instructions corresponding to the method for generating interoperability rules according to the embodiments of the present disclosure may be stored on a storage medium such as an optical disk, a hard disk, a USB device etc. When the computer program instructions in the storage medium corresponding to the method for generating interoperability rules are read or executed by an electronic device, the following steps are performed: presetting multiple interoperability rules; selecting at least one interoperability rule from the multiple interoperability rules; loading the at least one interoperability rule; and controlling multiple smart home devices connected to a smart controller based on the at least one interoperability rule.

Alternatively, when computer instructions stored in the storage medium, which correspond to the step of selecting at least one interoperability rule from the multiple interoperability rules, are executed, the following steps are further performed: scanning and obtaining the multiple smart home devices connected to the smart controller; determining, according to the multiple smart home devices, at least one selectable installation package which can be matched with the multiple smart home devices from the multiple application-scenario-based installation packages; displaying the at least one selectable installation package on a display screen of the smart controller for selection by a user; and obtaining a selection operation, and determining, in response to the selection operation, an installation package to be loaded from the at least one selectable installation package.

Alternatively, when computer instructions stored in the storage medium, which correspond to the step of loading the at least one interoperability rule, are executed, the following steps are further performed: installing the installation package to be loaded; and automatically setting all interoperability rules in a set of interoperability rules corresponding to the installation package to be loaded when the installation package to be loaded is installed.

Alternatively, when computer instructions stored in the storage medium, which correspond to the step of selecting at least one interoperability rule from the multiple interoperability rules, are executed, the following steps are further performed: displaying the multiple application-scenario-based installation packages on a display screen of the smart controller for selection by a user, wherein the multiple application-scenario-based installation packages are used as selectable installation packages; and obtaining a selection operation, and determining, in response to the selection operation, an installation package to be loaded from the multiple application-scenario-based installation packages.

Alternatively, when computer instructions stored in the storage medium, which correspond to the step of loading the at least one interoperability rule, are executed, the following steps are further performed: installing the installation package to be loaded; scanning and obtaining the multiple smart home devices connected to the smart controller during the process of installing the installation package to be loaded; judging, based on the multiple smart home devices, whether all interoperability rules in the set of interoperability rules corresponding to the installation package to be loaded are matched with the multiple smart home devices, to generate a judgment result; and automatically setting all interoperability rules in the set of interoperability rules corresponding to the installation package to be loaded after the installation package to be loaded is installed when the judgment result indicates that the multiple smart home devices are matched with all interoperability rules in the set of interoperability rules corresponding to the installation package to be loaded.

Alternatively, after computer instructions stored in the storage medium, which correspond to the step of judging, based on the multiple smart home devices, of whether all interoperability rules in the set of interoperability rules corresponding to the installation package to be loaded are matched with the multiple smart home devices to generate a judgment result, are executed, the following steps are further performed: determining multiple first interoperability rules in the set of interoperability rules which are not matched with the multiple smart home devices when the judgment result indicates that not all of the interoperability rules in the set of interoperability rules corresponding to the installation package to be loaded are matched with the multiple smart home devices; processing the multiple first interoperability rules to generate a new set of interoperability rules corresponding to the installation package to be loaded; and automatically setting all interoperability rules in the new set of interoperability rules corresponding to the installation package to be loaded after the installation package to be loaded is installed.

Alternatively, after computer instructions stored in the storage medium, which correspond to the step of judging, based on the multiple smart home devices, of whether all interoperability rules in the set of interoperability rules corresponding to the installation package to be loaded are matched with the multiple smart home devices, to generate a judgment result, are executed, the following steps are further performed: determining multiple first interoperability rules in the set of interoperability rules which are not matched with the multiple smart home devices when the judgment result indicates that not all of the interoperability rules in the set of interoperability rules corresponding to the installation package to be loaded are matched with the multiple smart home devices; and generating prompt information based on the multiple first interoperability rules.

Alternatively, when computer instructions stored in the storage medium, which correspond to the step of generating prompt information based on the multiple first interoperability rules, are executed, the following steps are further performed: determining an absent first smart home device based on the multiple first interoperability rules, wherein the first smart home device does not belong to the multiple smart home devices; and generating prompt information of purchase information of the first smart home device; or generating, based on the multiple first interoperability rules, prompt information that accuracy in an application scenario corresponding to the installation package to be loaded will be reduced.

Alternatively, when computer instructions stored in the storage medium, which correspond to the step of controlling multiple smart home devices connected to the smart controller based on the at least one interoperability rule, are executed, the following steps are further performed: obtaining state information of multiple condition devices; determining the at least one interoperability rule by inquiring a list of interoperability rules in an active state based on the state information of the multiple condition devices; and controlling multiple response devices based on the at least one interoperability rule.

Although preferable embodiments of the present disclosure have been described, additional changes and modifications can be made to these embodiments by those skilled in the art upon learning the basic creative concepts. Therefore, the appended claims are intended to be construed as comprising the embodiments and all changes and modifications that fall into the scope of the present disclosure.

Obviously, those skilled in the art can make various modifications and variations to the present disclosure without departing from the spirit and scope of the present disclosure. Thus, if these modifications and variations of the present disclosure belong to the scope of the claims of the present disclosure and the equivalent technologies thereof, the present disclosure is also intended to include these modifications and variations.

I claim:

1. A method implemented at a smart controller for generating interoperability rules, comprising:
   pre-storing a plurality of application-scenario-based installation packages at the smart controller, wherein each of the plurality of application-scenario-based installation packages is a set of interoperability rules comprising a plurality of interoperability rules corresponding to one application scenario, wherein each of the plurality of interoperability rules is a control rule for controlling at least one execution device according to states of at least one condition device;
   displaying at least one installation package on a display screen of the smart controller for selection by a user, wherein selecting at least one installation package that match a plurality of smart home devices connected to the smart controller among the plurality of application-scenario-based installation packages and displaying the at least one installation package that match the plurality of smart home devices to the user, or displaying each of the plurality of application-scenario-based installation packages to the user;
   determining an installation package to be loaded among the at least one installation package displayed on the display screen based on user selection;
   selecting all interoperability rules that match the plurality of smart home devices from the installation package to be loaded, wherein all interoperability rules comprised in the installation package to be loaded match the plurality of smart home devices when the installation package to be loaded matches the plurality of smart home devices;

installing the installation package to be loaded on the smart controller to load the interoperability rules that match the plurality of smart home on the smart controller; and controlling the plurality of smart home devices connected to the smart controller based on interoperability rules loaded on the smart controller.

2. The method according to claim 1, wherein the selecting of at least one interoperability rule from the plurality of interoperability rules comprises:

scanning and obtaining the plurality of smart home devices connected to the smart controller;

determining, according to the multiple smart home devices, at least one selectable installation package which can be matched with the plurality of smart home devices from the plurality of application-scenario-based installation packages;

displaying the at least one selectable installation package on a display screen of the smart controller for selection by a user; and obtaining a selection operation, and determining, in response to the selection operation, an installation package to be loaded from the at least one selectable installation package.

3. The method according to claim 2, wherein the loading of the at least one interoperability rule comprises:

installing the installation package to be loaded; and automatically setting all interoperability rules in a set of interoperability rules corresponding to the installation package to be loaded when the installation package to be loaded is installed.

4. The method according to claim 1, wherein the selecting of at least one interoperability rule from the plurality of interoperability rules comprises:

displaying the plurality of application-scenario-based installation packages on a display screen of the smart controller for selection by a user, wherein the plurality of application-scenario-based installation packages are used as selectable installation packages; and obtaining a selection operation, and determining, in response to the selection operation, an installation package to be loaded from the plurality of application-scenario-based installation packages.

5. The method according to claim 4, wherein the loading of the at least one interoperability rule comprises:

installing the installation package to be loaded;

scanning and obtaining the plurality of smart home devices connected to the smart controller during the process of installing the installation package to be loaded;

judging, based on the plurality of smart home devices, whether all interoperability rules in the set of interoperability rules corresponding to the installation package to be loaded are matched with the plurality of smart home devices, to generate a judgment result; and automatically setting all interoperability rules in the set of interoperability rules corresponding to the installation package to be loaded after the installation package to be loaded is installed when the judgment result indicates that the plurality of smart home devices are matched with all interoperability rules in the set of interoperability rules corresponding to the installation package to be loaded.

6. The method according to claim 5, wherein after the judging, based on the plurality of smart home devices, of whether all interoperability rules in the set of interoperability rules corresponding to the installation package to be loaded are matched with the plurality of smart home devices, to generate a judgment result, the method further comprises:

determining a plurality of first interoperability rules in the set of interoperability rules which are not matched with the plurality of smart home devices when the judgment result indicates that not all of the interoperability rules in the set of interoperability rules corresponding to the installation package to be loaded are matched with the plurality of smart home devices;

processing the plurality of first interoperability rules to generate a new set of interoperability rules corresponding to the installation package to be loaded; and automatically setting all interoperability rules in the new set of interoperability rules corresponding to the installation package to be loaded after the installation package to be loaded is installed.

7. The method according to claim 5, wherein after the judging, based on the plurality of smart home devices, of whether all interoperability rules in the set of interoperability rules corresponding to the installation package to be loaded are matched with the plurality of smart home devices, to generate a judgment result, the method further comprises:

determining a plurality of first interoperability rules in the set of interoperability rules which are not matched with the plurality of smart home devices when the judgment result indicates that not all of the interoperability rules in the set of interoperability rules corresponding to the installation package to be loaded are matched with the plurality of smart home devices; and generating prompt information based on the plurality of first interoperability rules.

8. The method according to claim 7, wherein the generating of prompt information based on the plurality of first interoperability rules comprises:

determining an absent first smart home device based on the plurality of first interoperability rules, wherein the first smart home device does not belong to the plurality of smart home devices; and generating prompt information of purchase information of the first smart home device; or generating, based on the plurality of first interoperability rules, prompt information that accuracy in an application scenario corresponding to the installation package to be loaded will be reduced.

9. The method according to claim 1, wherein the controlling of the plurality of smart home devices connected to the smart controller based on the at least one interoperability rule comprises:

obtaining state information of a plurality of condition devices;

determining the at least one interoperability rule by inquiring a list of interoperability rules in an active state based on the state information of the plurality of condition devices; and controlling a plurality of response devices based on the at least one interoperability rule.

10. A smart controller, comprising:

a storage configured to pre-store a plurality of application-scenario-based installation packages at the smart controller, wherein each of the plurality of application-scenario-based installation packages is a set of interoperability rules comprising a plurality of interoperability rules corresponding to one application scenario, wherein each of the plurality of interoperability rules is a control rule for controlling at least one execution devices according to states of at least one condition devices; and a processor configured to:
  display at least one installation package on a display screen of the smart controller for selection by a user, wherein selecting at least one installation package that match a plurality of smart home devices connected to the smart controller among the plurality of application-scenario-based installation packages and displaying the at least one installation package that match the plurality of smart home devices to the user, or displaying each of the plurality of application-scenario-based installation packages to the user, to determine an installation package to be loaded among the at least one installation package displayed on the display screen based on user selection,
  select all interoperability rules that match the plurality of smart home devices from the installation package to be loaded, wherein all interoperability rules comprised in the installation package to be loaded match the plurality of smart home devices when the installation package to be loaded matches the plurality of smart home devices,
  install the installation package to be loaded on the smart controller to load the interoperability rules that match the plurality of smart home on the smart controller, and control the plurality of smart home devices connected to the smart controller based on the interoperability rules loaded on the smart controller.

11. The smart controller according to claim 10, wherein the processor is further configured to scan and obtain the plurality of smart home devices connected to the smart controller, to determine, according to the plurality of smart home devices, at least one selectable installation package which can be matched with the plurality of smart home devices from the plurality of application-scenario-based installation packages, to display the at least one selectable installation package on a display screen of the smart controller for selection by a user, to obtain a selection operation, and to determine, in response to the selection operation, an installation package to be loaded from the at least one selectable installation package.

12. The smart controller according to claim 11, wherein the processor is further configured to install the installation package to be loaded, and to automatically set all interoperability rules in a set of interoperability rules corresponding to the installation package to be loaded when the installation package to be loaded is installed.

13. The smart controller according to claim 10, wherein the processor is further configured to display the plurality of application-scenario-based installation packages on a display screen of the smart controller for selection by a user, wherein the plurality of application-scenario-based installation packages are used as selectable installation packages, to obtain a selection operation, and to determine, in response to the selection operation, an installation package to be loaded from the plurality of application-scenario-based installation packages.

14. The smart controller according to claim 13, wherein the processor is further configured to install the installation package to be loaded, to scan and obtain the plurality of smart home devices connected to the smart controller during the process of installing the installation package to be loaded, to judge, based on the plurality of smart home devices, whether all interoperability rules in the set of interoperability rules corresponding to the installation package to be loaded are matched with the plurality of smart home devices, to generate a judgment result, and to automatically set all interoperability rules in the set of interoperability rules corresponding to the installation package to be loaded after the installation package to be loaded is installed when the judgment result indicates that the plurality of smart home devices are matched with all interoperability rules in the set of interoperability rules corresponding to the installation package to be loaded.

15. The smart controller according to claim 14, wherein the processor is further configured to determine a plurality of first interoperability rules in the set of interoperability rules which are not matched with the plurality of smart home devices when the judgment result indicates that not all of the interoperability rules in the set of interoperability rules corresponding to the installation package to be loaded are matched with the plurality of smart home devices, to process the plurality of first interoperability rules to generate a new set of interoperability rules corresponding to the installation package to be loaded, and to automatically set all interoperability rules in the new set of interoperability rules corresponding to the installation package to be loaded after the installation package to be loaded is installed.

16. The smart controller according to claim 14, wherein the processor is further configured to determine a plurality of first interoperability rules in the set of interoperability rules which are not matched with the plurality of smart home devices when the judgment result indicates that not all of the interoperability rules in the set of interoperability rules corresponding to the installation package to be loaded are matched with the plurality of smart home devices, and to generate prompt information based on the plurality of first interoperability rules.

17. The smart controller according to claim 16, wherein the processor is further configured to determine an absent first smart home device based on the plurality of first interoperability rules, wherein the first smart home device does not belong to the plurality of smart home devices, and to generate prompt information of purchase information of the first smart home device; or to generate, based on the plurality of first interoperability rules, prompt information that accuracy in an application scenario corresponding to the installation package to be loaded will be reduced.

18. The smart controller according to claim 10, wherein the processor is further configured to obtain state information of a plurality of condition devices, to determine the at least one interoperability rule by inquiring a list of interoperability rules in an active state based on the state information of the plurality of condition devices, and to control a plurality of response devices based on the at least one interoperability rule.

* * * * *